US009928025B2

(12) United States Patent
MacNeille et al.

(10) Patent No.: US 9,928,025 B2
(45) Date of Patent: Mar. 27, 2018

(54) DYNAMICALLY EQUALIZING RECEIVER

(71) Applicant: Ford Global Technologies, LLC, Dearborn, MI (US)

(72) Inventors: Perry Robinson MacNeille, Lathrup Village, MI (US); Oleg Yurievitch Gusikhin, Commerce Township, MI (US); Doug VanDagens, Beverly Hills, MI (US); Omar Makke, Lyon Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/170,466

(22) Filed: Jun. 1, 2016

(65) Prior Publication Data
US 2017/0351480 A1 Dec. 7, 2017

(51) Int. Cl.
H04B 1/00 (2006.01)
G06F 3/16 (2006.01)
G06F 17/30 (2006.01)
H04W 8/22 (2009.01)

(52) U.S. Cl.
CPC ........ G06F 3/165 (2013.01); G06F 17/30743 (2013.01); G06F 17/30761 (2013.01); H04W 8/22 (2013.01)

(58) Field of Classification Search
CPC ............... G06F 3/165; G06F 17/30743; G06F 17/30761; H04W 8/22
USPC ......... 381/86; 700/94; 725/25; 455/3.01, 99, 455/152.1, 414.1
See application file for complete search history.

(56) References Cited

U.S. PATENT DOCUMENTS

| 5,581,621 | A | 12/1996 | Koyama et al. |
| 2005/0251273 | A1 | 11/2005 | Bychowsky et al. |
| 2006/0020589 | A1* | 1/2006 | Wu ................... G06F 17/30017 |
| 2008/0009238 | A1* | 1/2008 | Harris ............... H04N 7/17318 |
| | | | 455/3.01 |
| 2008/0013752 | A1 | 1/2008 | Stephens |
| 2008/0075303 | A1 | 3/2008 | Kim et al. |
| 2008/0175411 | A1 | 7/2008 | Greve |
| 2009/0290725 | A1 | 11/2009 | Huang |

(Continued)

FOREIGN PATENT DOCUMENTS

| KR | 20000001636 A | 1/2000 |
| WO | WO 2005/109635 A1 | 11/2005 |
| WO | WO 2005106843 A1 | 11/2005 |

OTHER PUBLICATIONS

Search Report dated Nov. 1, 2017, for GB Patent Application No. GB1708680.2 (6 pages).

Primary Examiner — Vivian Chin
Assistant Examiner — Friedrich W Fahnert
(74) Attorney, Agent, or Firm — James P. Muraff; Neal, Gerber & Eisenberg LLP

(57) ABSTRACT

Systems and methods are disclosed for a dynamically equalizing receiver. An example disclosed system includes a mobile device and a vehicle. The example mobile device generates a sound profile based on media identifying information. The sound profile specifies equalizer settings for a receiver. The example vehicle includes the receiver. The receiver is communicatively coupled to the mobile device. The example receiver collects the media identifying information, and adjusts the equalizer settings of the receiver as specified by the sound profile.

12 Claims, 7 Drawing Sheets

(56) References Cited

U.S. PATENT DOCUMENTS

| | | |
|---|---|---|
| 2010/0284528 A1 | 11/2010 | Bongiovi |
| 2012/0164989 A1* | 6/2012 | Xiao ................... G07C 5/008 |
| | | 455/414.1 |
| 2014/0142958 A1* | 5/2014 | Sharma ................ G10L 19/02 |
| | | 704/500 |
| 2014/0309870 A1* | 10/2014 | Ricci .................... H04W 48/04 |
| | | 701/36 |
| 2014/0314261 A1* | 10/2014 | Selig ..................... H04R 25/50 |
| | | 381/314 |
| 2015/0073574 A1 | 3/2015 | Brenner et al. |
| 2015/0181289 A1* | 6/2015 | Wheatley ......... H04N 21/44222 |
| | | 725/14 |
| 2015/0195663 A1 | 7/2015 | Lin et al. |
| 2016/0261911 A1* | 9/2016 | Soundararajan . H04N 21/44218 |

\* cited by examiner

DYNAMICALLY EQUALIZING RECEIVER

TECHNICAL FIELD

The present disclosure generally relates to vehicle sound systems and, more specifically, a dynamically equalizing amplifier.

BACKGROUND

Vehicle sounds systems have amplifier settings (e.g., bass, mid, treble, fade, balance, etc.) that can be adjusted to change the quality of the sound played on the sound system. Often, occupants of the vehicle listen to the radio without changing the amplifier settings. Certain genres and/or performers sound better with specific equalizer settings. For example, Metallica songs sound better when midrange frequencies are low, while Iron Maiden sounds better when the midrange frequencies are high.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Systems and methods are disclosed for a dynamically equalizing receiver. An example disclosed system includes a mobile device and a vehicle. The example mobile device generates a sound profile based on media identifying information. The sound profile specifies equalizer settings for a receiver. The example vehicle includes the receiver. The receiver is communicatively coupled to the mobile device. The example receiver collects the media identifying information, and adjusts the equalizer settings of the receiver as specified by the sound profile.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
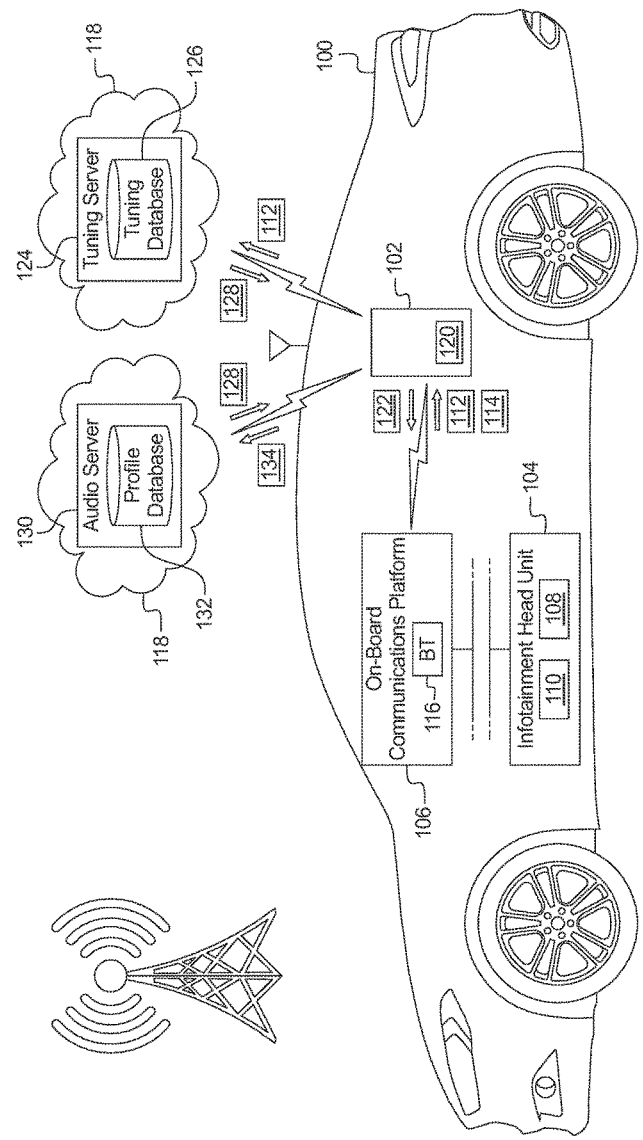
FIG. 1 illustrates a vehicle and a mobile device operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles have sounds systems that play media from various sources, such as over-the-air radio broadcasts (e.g., frequency modulation (FM) radio or amplitude modulation (AM) radio), satellite radio, streaming from an external network (e.g., the Internet, etc.), and an digital music player (e.g., a compact disc player, an MP3 player, etc.), etc. Depending on the type of broadcast (e.g., analog radio, digital radio, etc.), the sound system may have a varied amount of media identifying information. For example, if the broadcast is a digital radio broadcast, the media identifying information may include the title of the media, the duration of the media, a station identifier, a frequency identifier, and/or a broadcast time, etc. In contrast, for example, the media identifying information may be limited to the frequency the radio is tuned to and the current time. The vehicle (e.g., a car, a truck, a sports utility vehicle, a van, etc.) may be wired (e.g., via an AUX connection) or wirelessly (e.g., via a Bluetooth connection, via a local area wireless connection, etc.) communicatively coupled to a mobile device (e.g. a smart phone, a smart watch, a tablet, a laptop, etc.). The mobile device is communicatively coupled (e.g., via a cellular connection) to an external network.

As disclosed in more detail below, the vehicle sends the available media identifying information to the mobile device. Based on the information in the media identifying information, the mobile device determines audio characteristics of the identified media presentation (e.g., a song, a talk radio program, etc.) and generates a receiver profile. The receiver profile specifies specific equalizer settings (e.g., bass, mid, treble, fade, balance, compression, phase, coda, attack, timbre, overtone series, attack/decay/sustain/release (ADSR) envelope, instrument (voice, saxophone, etc), etc.) and/or amplifier settings (e.g., fade of the vehicle's speakers, etc.) for the media presentation. In some examples, the mobile device also factors in the sound environment of the vehicle. For example, the receiver profile may instruct the vehicle sound system to amplify a certain frequency band based to compensate for the particular noises in the vehicle. In some examples, the mobile device communicatively couples to a tuning server that, based on the media identifying information received from the vehicle, identifies the media presentation. Additionally, in some examples, the mobile device communicatively couples to an audio server to, based on the identity of the media, identify receiver settings for that media presentation.

FIG. 1 illustrates a vehicle 100 and a mobile device 102 operating in accordance with the teachings of this disclosure. The vehicle 100 may be a standard gasoline powered vehicle, a hybrid vehicle, an electric vehicle, a fuel cell vehicle, or any other mobility implement type of vehicle. The vehicle 100 may be non-autonomous, semi-autonomous, or autonomous. The vehicle 100 includes parts related to mobility, such as a powertrain with an engine, a transmission, a suspension, a driveshaft, and/or wheels, etc. In the illustrated example, the vehicle 100 includes an infotainment head unit 104 and an on-board communications platform 106.

The infotainment head unit 104 provides an interface between the vehicle 100 and a user (e.g., a driver, a passenger, etc.). The infotainment head unit 104 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a dashboard panel, a heads-up display, a center console display (e.g., a liquid crystal display ("LCD"), an organic light emitting diode ("OLED") display, a flat panel display, a solid state display, or a heads-up display), and/or speakers.

In the illustrated example, the infotainment head unit 104 includes an auxiliary port 108 and one or more receivers 110. The auxiliary port 108 provides hardware and software for a wired connection between mobile device 102 and the infotainment head unit 104. The auxiliary port 108 includes one or more ports (e.g., a universal serial bus (USB) port, a Lightning® connector port, etc.) in which to pug a cable (not shown) between the mobile device 102 and the auxiliary port 108.

The receiver(s) 110 (e.g., an over-the-air radio receiver, a satellite radio receiver, etc.) receive media broadcasts. The receiver(s) 110 receive the media broadcasts via, for example, an antenna, process (e.g., decode, decompress, etc.) the media broadcast, and drive the speakers to present the media broadcast. The input devices of the infotainment head unit 104 may be used to manually change settings (e.g., equalizer settings, fade settings, etc.) of the receiver 110. From time to time, the receiver 110 generates media identifying information. In some examples, the receiver 110 receives media identifying information 112 (e.g., the title of the media presentation, the duration of the media presentation, a station identifier, a frequency identifier, and/or a broadcast time, etc.) from the media broadcasts. For example, if the over-the-air radio signal is a digital signal, the receiver 110 decodes the media identifying information 112 from the media broadcast. Alternatively, in some examples, receiver 110 generates media identifying information 112 based on information that is known to the receiver (e.g., the tuned frequency, the time, an acoustic or digital fingerprint, etc.). In some examples, the receiver 110 also generates, based on microphones in the cabin of the vehicle 100, a vehicle noise profile 114. The vehicle noise profile 114 includes engine noise, road noise, ventilation noise, and/or cabin noise, etc.

The on-board communications platform 106 includes hardware (e.g., processors, memory, storage, antenna, etc.) and software to control wireless network interfaces. In the illustrated example, the on-board communications platform 106 includes a Bluetooth® (BT) controller 116 (based on the Bluetooth® Core Specification maintained by the Bluetooth Special Interest Group). The on-board communications platform 106 may also include one or more controllers for wireless local area networks (WLAN) such as a Wi-FI® controller (including IEEE 802.11 a/b/g/n/ac/p or others), a ZigBee® controller (IEEE 802.15.4), and/or a Near Field Communication (NFC) controller, etc. The mobile device 102 may be communicatively coupled to the on-board communications platform 106 via the BT controller 116.

The mobile device 102 of the illustrated example may be any suitable device that (a) can establish a connection with the vehicle 100 (e.g., via the auxiliary port 108 or the BT controller 116), (b) can establish a connection with an external network 118 (e.g., via a cellular connection, a WLAN connection, etc.), and (c) execute applications. For example, the mobile device 102 may be a smart phone, a tablet, a smart watch, or an Internet appliance, etc. In the illustrated example, the mobile device 102 includes receiver adjuster 120. As disclosed in more detail in connection with FIG. 4 below, the receiver adjuster 120, based on the media identifying information 112 received from the receiver 110, generates a receiver profile 122. The receiver profile 122 specifies equalizer and/or amplifier settings for the media presentation identified by the media identifying information 112. The receiver profile 122 specifies different frequency bands or overtone series. For example, the receiver profile 122 may specify a bass frequency band (e.g., 20 hertz (Hz) to 320 Hz), midrange frequency band (sometimes referred to as "MID") (e.g., 320 Hz to 1280 Hz), and treble frequency band (e.g., 1280 Hz to 20,480 Hz). As another example, the receiver profile 122 may specify a voice setting that modifies voice signals by adjusting the voice overtone series. In some examples, the receiver profile 122 specifies equalizer settings for three frequency bands, such as bass frequency band, midrange frequency band, and treble frequency band. In some examples, the receiver profile 122 specifies equalizer settings for five frequency bands (e.g., band 1: 20 Hz to 80 Hz, band 2: 80 Hz to 320 Hz, band 3: 320 Hz to 1280 Hz, band 4: 1280 Hz to 5,120 Hz, and band 5: 5,120 Hz to 20,480 Hz). Additionally, in some examples, the receiver profile 122 also specifies amplifier settings (e.g., fade, etc.). In some examples, the receiver profile 122 specifies a modification of the overtone series and ADSR for particular instruments. For example, the guitar may be muted while the saxophone may be augmented.

In some examples, the identity of the media information is included with the media identifying information 112. In some examples, to identify the media presentation, the receiver adjuster 120 connects to a tuning server 124 on the external network 118. In such examples, the receiver adjuster 120 sends (sometimes referred to as "queries") the media identifying information 112 to the tuning server 124. The tuning server 124 includes a tuning database 126 that includes identities 128 of media presentation associated with media identifying information 112. For example, the tuning database 126 may include tuning frequencies associated with the identities 128 of the media presentation being presented by that particular radio frequency. As another example, if the media identifying information 112 includes the radio frequency of 88.1 MHz, the identity 128 of the media presentation may be "Don't Let Me Down." The tuning server 124 is operated by any suitable entity that compiles information on radio media.

The receiver adjuster 120 connects to an audio server 130. The audio server 130 includes a profile database 132 that includes baseline receiver profiles 134 (sometimes referred to as "baseline sound profiles") associated with the identities 128 of the media presentations. The receiver adjuster 120 sends the identity 128 of the media presentation received from the tuning server 124 to the audio server 130. The audio server 130 sends the corresponding baseline receiver profiles 134 to the receiver adjuster 120. The baseline receiver profile 134 includes receiver settings recommended for the corresponding media presentation. For example, if the media presentation is a rock song, the baseline receiver profile 134 may specify a bass of 70%, a midrange of 20%, and a treble of 60%. In some examples, the baseline receiver profile 134 is a dynamic profile that specifies settings for the receiver 110 the duration of the media presentation. For example, for a first time period, the baseline receiver profile 134 may specify a bass of 70%, a midrange of 20%, a treble of 60%, front speaker fade of 50%, and rear speaker fade of 50%. In such an example, for a second time period, the baseline receiver profile 134 may specify a bass of a bass of 30%, a midrange of 80%, a treble of 40%, front speaker fade of 10%, and rear speaker fade of 80%. The receiver adjuster 120 adjusts the baseline receiver profile 134 to generate the receiver profile 122. The baseline receiver profile 134 is adjusted, for example, based on the vehicle noise profile 114 and/or preferences of the user of the mobile device 102. For example, the user may prefer more bass than recommended and the vehicle noise profile 114 may indicate that quieter parts of the bass range are to be amplified.

The external network(s) 118 may be a public network, such as the Internet; a private network, such as an intranet; or combinations thereof, and may utilize a variety of networking protocols now available or later developed including, but not limited to, TCP/IP-based networking protocols and wireless network protocols. In some examples, the tuning server 124 and the audio server 130 may be the same server. In some such examples, the tuning database 126 and the profile database 132 may be the same database.

Figure 2:
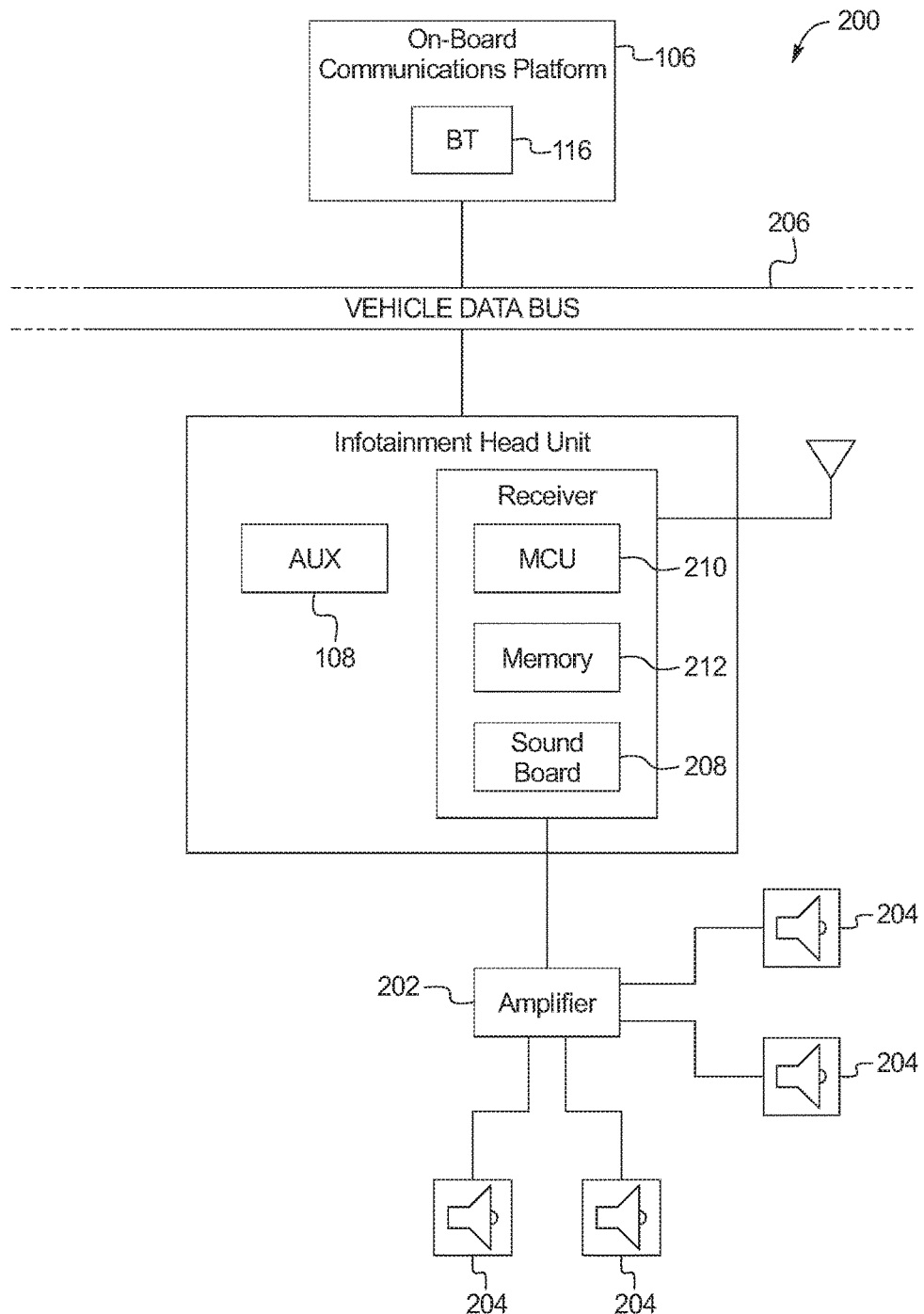
FIG. 2 is a block diagram of electronic components of the vehicle of FIG. 1.

FIG. 2 a block diagram of electronic components 200 of the vehicle of FIG. 1. In the illustrated example, the electronic components 200 include an amplifier 202, speakers 204, a vehicle data bus 206, the infotainment head unit 104, and the on-board communications platform 106. The amplifier 202 amplifies signals from the receiver 110 suitable to play the media presentation on the speakers 204. The speakers 204 may be arranged in and around the vehicle 100 in any suitable fashion. In some examples, the speakers 204 are organized into front speakers that are located in the front half of the cabin (e.g., one on a passenger-side door and one on a driver-side door), and rear speakers that are location the rear half of the cabin (e.g., on the doors).

The vehicle data bus 206 communicatively couples the infotainment head unit 104, the on-board communications platform 106, and other devices connected to the vehicle data bus 206. In some examples, the vehicle data bus 206 is implemented in accordance with the controller area network (CAN) bus protocol as defined by International Standards Organization (ISO) 11898-1. Alternatively, in some examples, the vehicle data bus 206 may be a Media Oriented Systems Transport (MOST) bus, or a CAN flexible data (CAN-FD) bus (ISO 11898-7).

The infotainment head unit 104 includes the auxiliary port 108 and the receiver 110. The receiver 110 equalizes, amplifies, and decodes audio signals received from audio-visual sources such as over-the-air radio, satellite radio, digital music sources (e.g., MP3 audio, DVD audio, etc.), etc. Additionally, the receiver 110 drives the amplifier 202 based on the receiver profile 122 received from the mobile device 102. In the illustrated example, the receiver 110 includes a sound board 208, a processor or controller 210, and memory 212. The sound board 208 includes the hardware to drive the speakers 204 via the amplifier 202.

The processor or controller 210 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 212 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. The memory 212 may include any high-capacity storage, such as a hard drive, and/or a solid state drive. In some examples, the memory 212 includes multiple kinds of memory, particularly volatile memory and non-volatile memory.

The memory 212 is a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 212, the computer readable medium, and/or within the processor 210 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Figure 3:
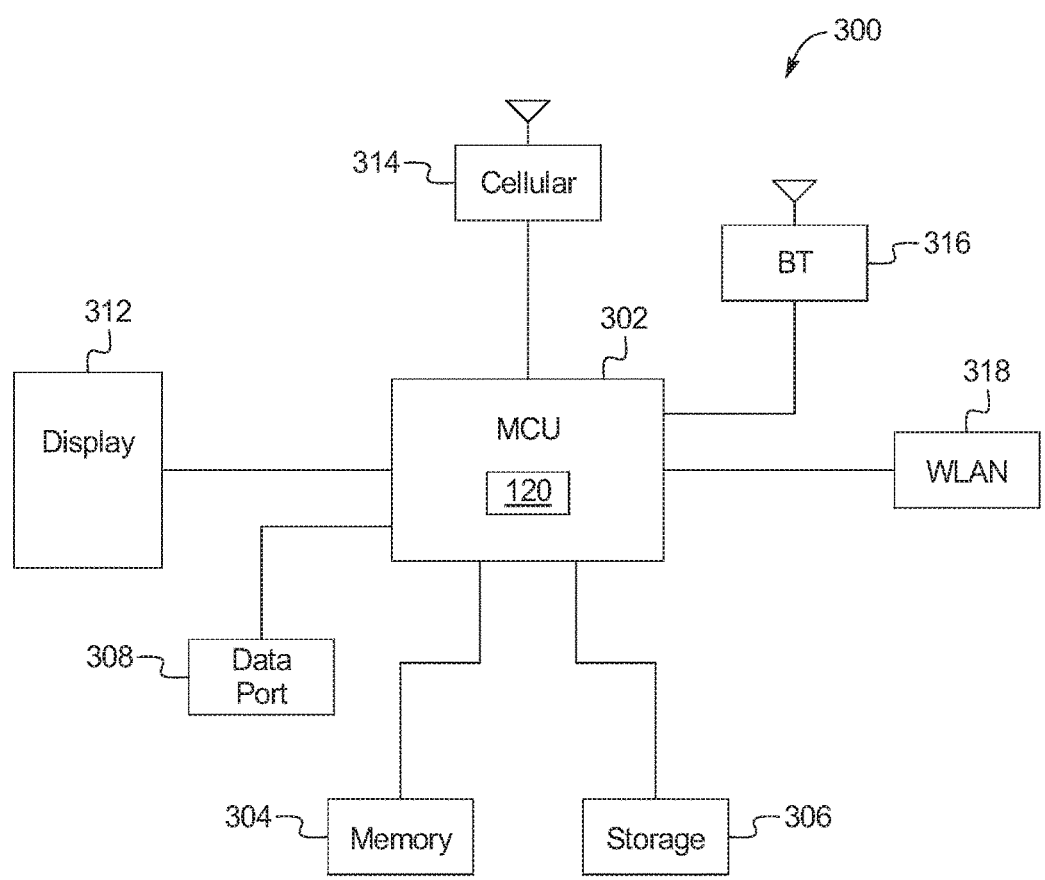
FIG. 3 is a block diagram of electronic components of the mobile device of FIG. 1.

FIG. 3 is a block diagram of electronic components 300 of the mobile device 102 of FIG. 1. In the illustrated example, the electronic components 300 include a processor or controller 302, memory 304, storage 306, a data port 308, a display 312, a cellular module 314, a Bluetooth module 316, and a WLAN module 318.

The processor or controller 302 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). In the illustrated example, the processor or controller 302 is structured to include the receiver adjuster 120. The memory 304 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. The memory 304 may include any high-capacity storage, such as a secure digital (SD) card or a solid state drive. In some examples, the memory 304 includes multiple kinds of memory, particularly volatile memory and non-volatile memory.

The memory 304 is a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 304, the computer readable medium, and/or within the processor 302 during execution of the instructions.

The data port 308 facilitates a wired connection between the mobile device 102 and, for example, the vehicle 100. The data port 308 includes a connector and a controller that includes the hardware and/or software to communicate based on a wired communication protocol, such as USB, FireWire (IEEE 1394), or Lightning, etc.

The display 312 provides an interface to the mobile device 102. The display 312 may be any suitable display technology, such as a liquid crystal display (LCD), a thin film transistor LCD, an organic light emitting diode (OLED) display, active-matrix OLED (AMOLED), an optical head-mounted display (OHMD), or a flexible display, etc. The display 312, through a graphical user interface (GUI), displays information regarding applications being executed by the mobile device. In some examples, the display 312 includes a sensor layer to form a touch screen and be an input device and an output device.

The cellular module 314 includes one or more controllers for standards-based networks (e.g., Global System for Mobile Communications (GSM), Universal Mobile Telecommunications System (UMTS), Long Term Evolution (LTE), Code Division Multiple Access (CDMA), etc.) that provide a data connection between the mobile device 102 and the external network(s) 118. The cellular module 314 also includes authorization device (such as a subscriber identification module (SIM) card, a protected memory chip containing an virtual SIM card, etc.). The Bluetooth® module 316 includes a Bluetooth® controller (based on the Bluetooth® Core Specification maintained by the Bluetooth Special Interest Group). The WLAN module 318 includes one or more controllers that facilitate connecting to wireless local area networks, such as a Wi-Fi® controller (including IEEE 802.11 a/b/g/n/ac or others).

Figure 4:
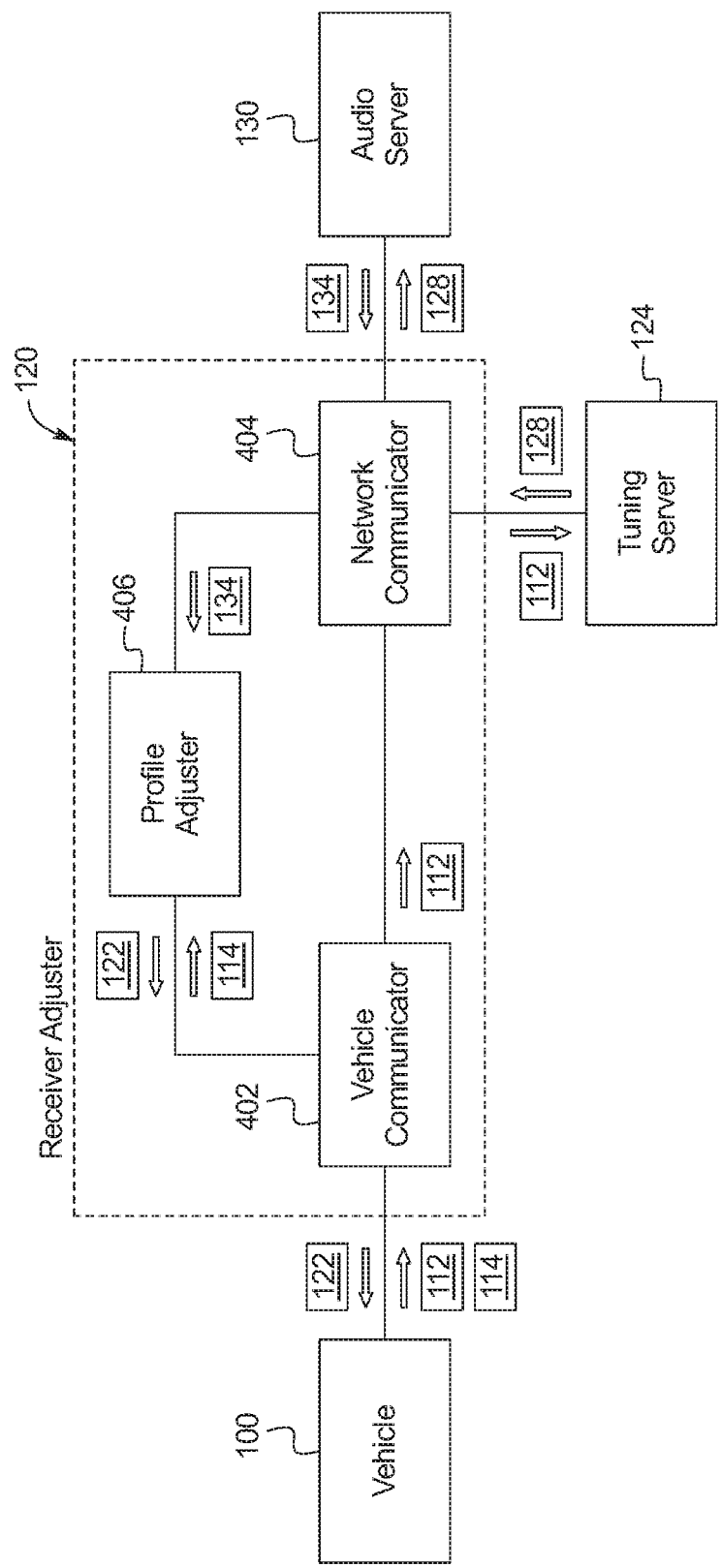
FIG. 4 is a block diagram of a receiver adjuster of the mobile device of FIG. 1.

FIG. 4 is a block diagram of the receiver adjuster 120 of the mobile device 102 of FIG. 1. The receiver adjuster 120 generates the receiver profile 122 based on the baseline receiver profile 134 received from the audio server 130, the vehicle noise profile 114 received from the vehicle 100, and preferences selected by a user. In the illustrated example, the receiver adjuster 120 includes a vehicle communicator 402, a network communicator 404, and a profile adjuster 406.

The vehicle communicator 402 establishes and maintains a connection with the vehicle 100 (e.g., via the Bluetooth® module 316 or the data port 308 of the mobile device 102). The vehicle communicator 402 receives the media identifying information 112 and the vehicle noise profile 114. The vehicle communicator 402 sends the media identifying information 112 to the network communicator 404 and the vehicle noise profile 114 to the profile adjuster 406.

The network communicator 404 connects to the tuning server 124 and the audio server 130 (e.g., via the cellular module 314 or the WLAN module 318 of the mobile device 102). In some examples, the network communicator 404 provides the media identifying information 112 to the tuning server 124. In response, the network communicator 404 receives the media presentation identity 128 from the tuning server 124. In some examples, the media identifying information 112 includes the media presentation identity 128. The network communicator 404 provides the media presentation identity 128 to the audio server 130. In response, the network communicator 404 receives the baseline receiver profile 134. In some examples, the network communicator 404 maintains (e.g. in the memory 304 and/or the storage 306 of the mobile device 102) a list of recently received media presentation identities 128 that associates the media presentation identity 128 to the corresponding baseline receiver profile 134 so that frequently encountered media presentations are available to the network communicator 404 without connecting to the audio server 130. The network communicator 404 provides the baseline receiver profile 134 to the profile adjuster 406.

The profile adjuster 406 generates the receiver profile 122 based on the baseline receiver profile 134, the vehicle noise profile 114, and, in some examples, the preferences selected by a user. In some examples the profile adjuster 406 receives the user preferences via a GUI displayed on the display 312 of the mobile device 102. The user preferences, for example, may provide general or particular adjustments to the baseline receiver profile 134. The profile adjuster 406 adjusts the baseline receiver profile 134 based on the vehicle noise profile 114 and the user preferences. For example, the baseline receiver profile 134 may specify a bass setting of 30%, a midrange setting of 80%, and a treble setting of 40% for the media presentation, the user preferences may specify a 10% increase in the treble setting for the particular genre, and the profile adjuster 406 may specify amplifying the frequencies in the 50 Hz to 250 Hz range to compensate for road noise based on the vehicle noise profile 114. The profile adjuster 406 sends the receiver profile 122 to the vehicle communicator 402.

Figure 5:
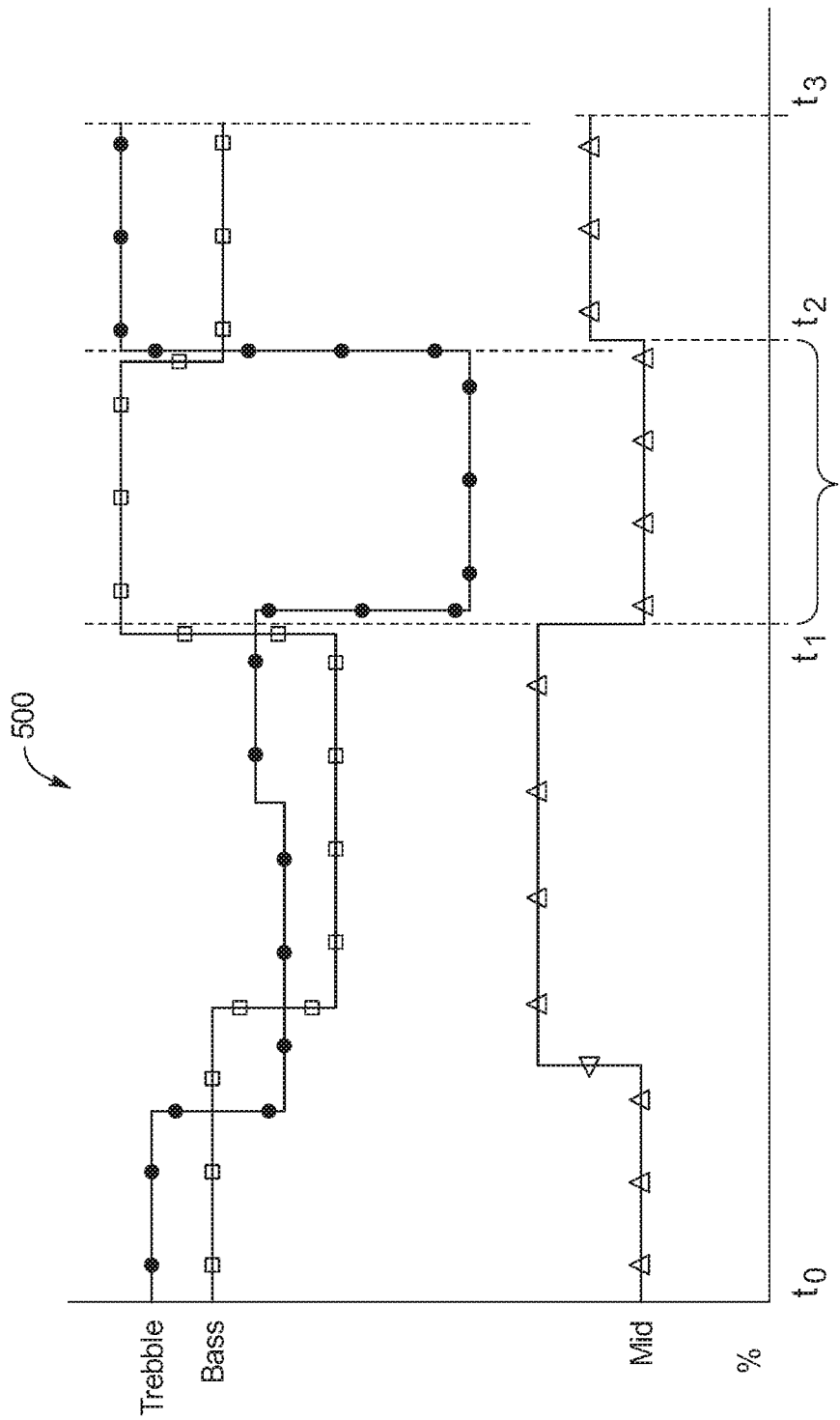
FIG. 5 is an example dynamic receiver profile.

FIG. 5 is an example dynamic receiver profile 500. The dynamic receiver profile 500 specifies receiver settings that change over time based on characteristics of the media presentation. For example, between time $t_1$ and time $t_2$, the media presentation may include a drum solo, where the dynamic receiver profile 500 specifies an increase in the bass setting and decreases in the midrange and treble settings. As another example, the between time $t_1$ and time $t_2$, the dynamic receiver profile 500 may specify increasing overtone sets and/or ADSR settings to emphasis the drums. In some examples, the baseline receiver profile 134 is a dynamic receiver profile 500. In such examples, the profile adjuster 406 generates the receiver profile 122 by adjusting the dynamic receiver profile 500 based on the vehicle noise profile 114 and the preferences selected by a user. When the receiver 110 receives the receiver profile 122 with the adjusted dynamic receiver profile 500, the receiver 110 determines at which time the media presentation is in its duration and applies the adjusted dynamic receiver profile 500 based on that time.

Figure 6:
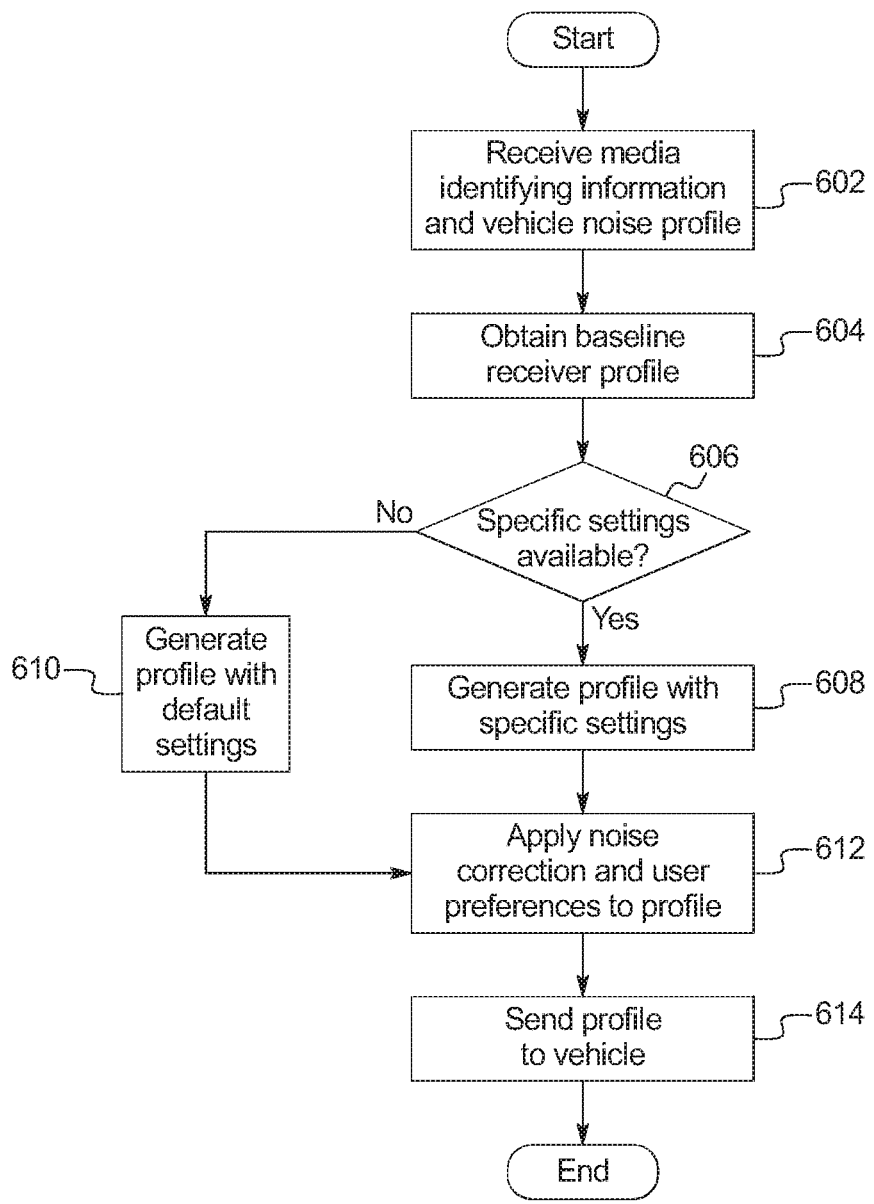
FIG. 6 is a flowchart of an example method to generate a receiver profile.

FIG. 6 is a flowchart of an example method to generate the receiver profile 122 of FIGS. 1 and 4. Initially, at block 602, the vehicle communicator 402 receives the media identifying information 112 and the vehicle noise profile 114 from the vehicle 100. At block 604, the network communicator 404 obtains the baseline receiver profile 134 associated with the media identifying information 112 obtained at block 602. To obtain the identity 128 of the media presentation, the network communicator 404 communicates with the tuning server 124 to identify the media presentation associated with the media identifying information 112. Based on the identity 128, the network communicator 404 communicates with the audio server 130 to obtain the baseline receiver profile 134. At block 606, the profile adjuster 406 determines whether specific settings are available for the media presentation. The profile adjuster determines that the specific settings are available based on whether the audio server 130 returns the baseline receiver profile 134. For example, audio server 130 may not include a baseline receiver profile 134 associated with the identity 128 of the media presentation. If specific settings are available for the media presentation, the method continues at block 608. Otherwise, if specific settings are available for the media presentation, the method continues at block 610.

At block 608, the profile adjuster 406 generates the receiver profile 122 based on the baseline receiver profile 134 received from the audio server 130. At block 610, the profile adjuster 406 generates the receiver profile 122 based on a default receiver profile. At block 612, the profile adjuster 406 adjusts the receiver profile 122 based on the vehicle noise profile 114 and/or user preferences. At block 614, the vehicle communicator 402 sends the receiver profile 122 to the vehicle 100.

Figure 7:
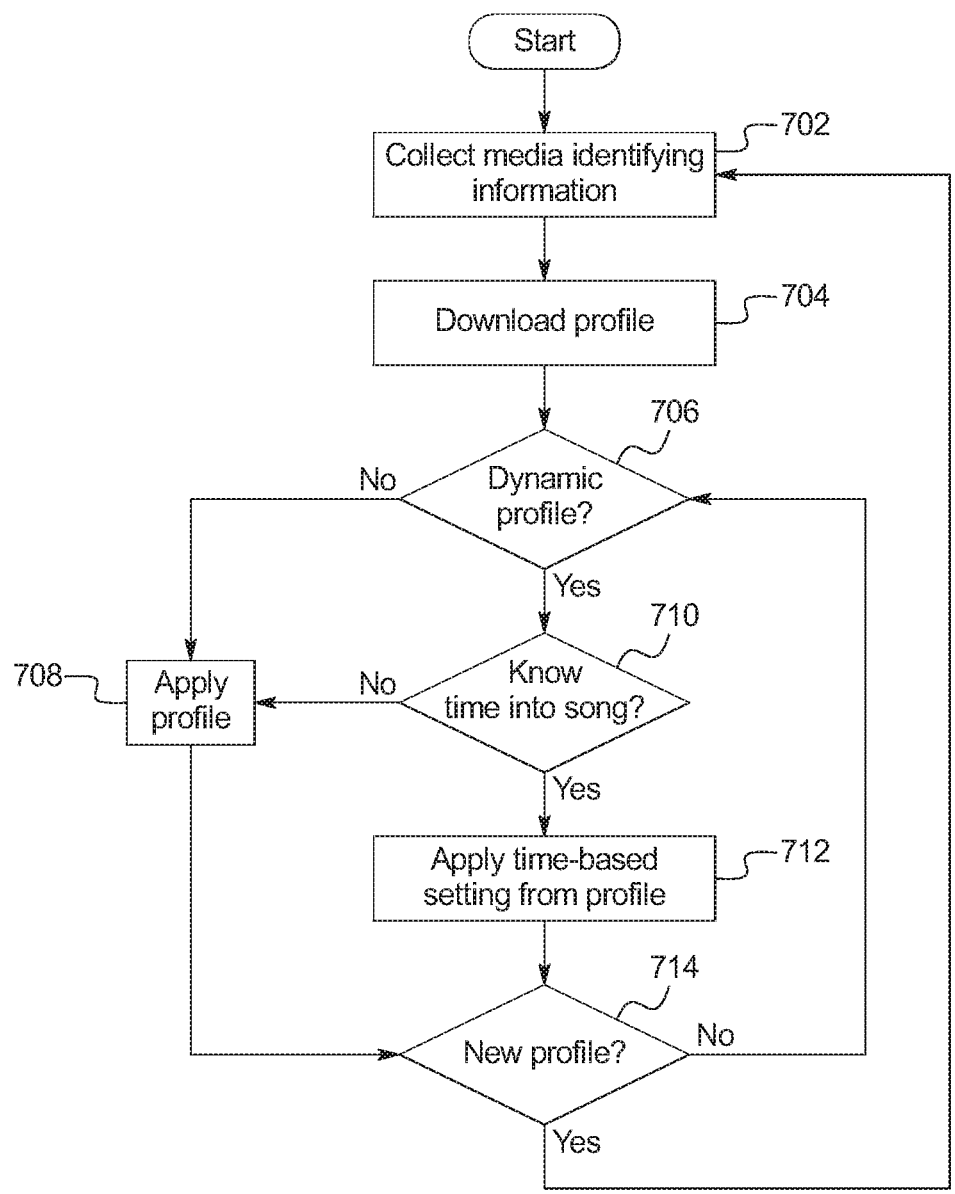
FIG. 7 is a flowchart of an example method to modify a configuration of a receiver based on the receiver profile.

FIG. 7 is a flowchart of an example method to modify a configuration of the receiver 110 based on the receiver profile 122 received from the mobile device 102. Initially, at block 702, the receiver 110 obtains the media identifying information 112. For example, the receiver 110 may record the tuning frequency of the over-the-air radio being played by the sound system. The receiver sends (e.g., via the BT controller 116 or the auxiliary port 108 of the vehicle 100) the media identifying information 112 to the mobile device 102. At block 704, the receiver downloads the receiver profile 122 from the mobile device 102. At block 706, the receiver 110 determines whether the receiver profile 122 received at block 704 is a dynamic profile (e.g., based on a dynamic receiver profile 500 of FIG. 5). If the receiver profile 122 is not a dynamic profile, the method continues to block 708. Otherwise, if the receiver profile 122 is a dynamic profile, the method continues to block 710.

At block 708, the receiver 110 applies the equalizer and amplifier settings specified by the receiver profile 122. At block 710, the receiver 110 determines whether it knows the time into the media presentation. For example, if the media presentation is a digital broadcast of an over-the-air radio signal, the digital broadcast may include the current time of the media presentation. If the receiver 110 knows the time into the media presentation, the method continues to block 712. Otherwise, if the receiver 110 does not know the time into the media presentation, the method continues to block 708. At block 712, the receiver applied the equalizer and amplifier settings specified by the receiver profile 122 specified for the current time of the media presentation. At block 714, the receiver 110 determines whether to request another receiver profile 122. In some examples, the receiver 110 requests another receiver profile 122 from time-to-time (e.g. periodically, aperiodically, etc.). Alternatively or additionally, the media presentation includes a signal (e.g., a tone, a momentary pause, a digital flag, etc.) when the current media presentation is over. If the receiver 110 determines to request another receiver profile 122, the method returns to block 702. Otherwise, if the receiver 110 determines not to request another receiver profile 122, the method returns to block 706.

The flowchart of FIG. 6 is representative of machine readable instructions that comprise one or more programs that, when executed by a processor (such as the processor 302 of FIG. 3), cause the mobile device 102 to implement the receiver adjuster 120 of FIGS. 1, 3, and 4. The flowchart of FIG. 7 is representative of machine readable instructions that comprise one or more programs that, when executed by a processor (such as the processor 210 of FIG. 2), cause the vehicle 100 to implement the receiver 110 of FIGS. 1 and 2. Further, although the example programs are described with reference to the flowcharts illustrated in FIGS. 6 and 7, many other methods of implementing the example receiver adjuster 120 and/or the example receiver 110 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle sound system comprising:
a mobile device to:
  receive media identifying information from a vehicle;
  query a first server that associates the media identifying information with an identity of a media presentation;
  query a second server that associates the identity of the media presentation with a baseline sound profile; and
  generate a sound profile based on the baseline sound profile retrieved with the media identifying information, the sound profile specifying equalizer settings;
the vehicle including a receiver communicatively coupled to the mobile device, the receiver configured to:
  collect the media identifying information; and
  adjust the equalizer settings of the receiver as specified by the sound profile.

2. The system of claim 1, wherein to generate the sound profile, the mobile device is to modify the baseline sound profile based on a vehicle noise profile received from the vehicle.

3. The system of claim 1, wherein to generate the sound profile, the mobile device is to modify the baseline sound profile based on user preferences for a genre associated with the identity of the media presentation.

4. The system of claim 1, wherein the equalizer settings specify three frequency ranges.

5. The system of claim 1, wherein the equalizer settings specify five frequency ranges.

6. A method for adjusting equalizer settings of a receiver in a vehicle, the method comprising:
periodically receiving media identifying information from the vehicle;
in response to receiving the media identifying information;
  querying a first server that associates the media identifying information with an identity of a media presentation to determine the identity of the media presentation; and
  querying a second server that associates the identity of the media presentation with a baseline sound profile to identify the baseline sound profile;
modifying the baseline sound profile based on user preference to generate a receiver sound profile, the receiver sound profile to specify the equalizer settings of the receiver; and sending the receiver sound profile to the vehicle to adjust equalizer settings of the receiver.

7. The method of claim 6, including receiving a vehicle noise profile with the media identifying information from the vehicle.

8. The method of claim 7, including modifying the baseline sound profile based on the vehicle noise profile.

9. The method of claim 6, wherein the equalizer settings specify three frequency ranges.

10. The method of claim 6, the equalizer settings specify five frequency ranges.

11. The method of claim 6, wherein the user preference is based on a genre associated with the identity of the media presentation.

12. A system comprising:
   a receiver in a vehicle communicatively coupled to a mobile device to:
      provide media identifying information; and
      adjust equalizer settings as specified by a sound profile; and
   the mobile device to:
      query a first server with the media identifying information to retrieve an identifier of a media presentation;
      query a second server with the identifier to retrieve a baseline sound profile; and
      generate the equalizer settings with the baseline sound profile.

* * * * *